United States Patent [19]

Lindberg et al.

[11] Patent Number: 5,073,020
[45] Date of Patent: Dec. 17, 1991

[54] EYEGLASSES HAVING OBLONG RECEIVING MEANS

[75] Inventors: Poul J. Lindberg, Egaa; Hans Dissing, Copenhagen, both of Denmark

[73] Assignee: Paul Jorn Lindberg, Egaa, Denmark

[21] Appl. No.: 634,764

[22] Filed: Dec. 27, 1990

Related U.S. Application Data

[63] Continuation of Ser. No. 533,814, Jun. 6, 1990, abandoned, which is a continuation of Ser. No. 231,539, Aug. 12, 1988, abandoned.

[51] Int. Cl.⁵ .................. G02C 1/04; G02C 1/02; G02C 5/14
[52] U.S. Cl. .................. 351/106; 351/110; 351/116
[58] Field of Search .............. 331/106, 116, 112, 149, 331/103, 110, 108, 109, 133, 134, 135, 178

[56] References Cited

U.S. PATENT DOCUMENTS

| 625,083 | 5/1899 | Belt | 351/121 |
| 2,439,357 | 4/1948 | Bouchard | 351/106 |

Primary Examiner—Rodney B. Bovernick
Attorney, Agent, or Firm—Antonelli, Terry, Stout & Kraus

[57] ABSTRACT

Eyeglasses including lens and frame portions with a holder and holding engagement with the lens. The frame portions are shaped of a wire material with the holder including looped bent wire portions projecting forwardly of the frame portions. The lens include a mounting hole or recess for receiving the loop bent wire portions, with the hole or recess being of an oblong shape corresponding to a cross-sectional shape of the loop bent wire portions so as to be operable to receive the respective loop bent wire portions with the loop bent wire portions resiliently squeezed between opposed narrow end portions of the oblong holes or recesses thereby insuring a firm yet releasable fixation between the lens and the frame portions.

13 Claims, 3 Drawing Sheets

EYEGLASSES HAVING OBLONG RECEIVING MEANS

This is a continuation of application Ser. No. 533,814, filed June 6, 1990, now abandoned which is a continuation application of application Ser. No. 231,539, filed Aug. 12, 1988, now abandoned.

BACKGROUND OF THE INVENTION

The present invention relates to eyeglasses, especially rimless eyeglasses, the lenses of which are fastened to the frames of the glasses by holding portions which are received in holes or recesses in the lenses. As examples of such an eyeglass type reference is made to the French patent specifications no. 62.079 and 1.087.904. By these and other corresponding known eyeglasses rimless or semi-rimless glasses may be secured without using an encircling rim. Hereby, however, both the lens mounting and the frame design are relatively complicated.

According to the invention a substantial simplification is obtained by the lenses being mounted on carrier member portions protruding straight forwardly from the frame and squeezed with a good holding effect in the holes or recesses. This conditions a simple frame construction, whereby the frame may even be constituted entirely by a wire material. The lenses are very easy to munt, and if the holder members are embodied with an increased length, so that they protrude in front of the front face of the lenses, they may even be used for holding additional glass members such as sun shades, when these are provided with the required holes or recesses. The user may easily mount and demount the additional glasses.

By the invention it is furthermore realized that it is advantageous that the holes or recesses be embodied with an oblong shape i.e., a shape which deviates from a circular or square form, for receiving holder members of a correspondingly oblong cross sectional shape, as the glasses may hereby, in a simple manner, be held in a non-rotatable manner relative the holder members. This embodiment is particularly appropriate for entirely rimless eyeglasses, where a good stability of the glasses will be obtained by the holder members being nonrotatable relative the lenses at the central bridge and the outer temple hinges, respectively. Another essential circumstance is that the oblong shape of the holes or recesses provides for the possibility of the holder portions in a simple manner consisting of a folded together loop portion of a stiff wire material appropriate for the relevant purpose, whereby it is possible to construct the eyeglass frame exclusively from bent, stiff wire material with no use of solded or welded portions, which conditions a substantially simplified production process.

When the frame portions generally consist of wire material it is extremely appropriate that also the temple hinges and the associated temples of the eyeglasses are made of wire material, and according to the invention this is made possible by each of the temple hinges being constituted by a pintle wire portion and a surrounding screw coiled wire portion, which wire portions continue in a temple and in a lens-carrying wire portion, respectively. Hereby the frame as a whole i.e. including the temples and the hinges, may be embodied exclusively of a bent wire material, whereby the whole frame may be produced automatically at quite low costs.

The invention may well comprise semi-rimless glasses, in which the lens holding frame portions are mutually connected through frame portions, e.g. wire portions, which extend along either the upper or the lower rim of the lenses between the bridge and hinge areas. As each of the lenses is hereby connected to the frame at both sides there are no special requirements of the lenses being connected to the frame in a non-rotatable manner at the single areas of engagement with the frame, as the frame in itself will secure the glasses agaist relative rotation, and, for the same reason, it is thus not necessary that the holes or recesses in the leses be of an oblong shape, i.e. in these cases they may well have a circular shape, regardless of this not being visually and use-wise attractive compared to a narrow, oblong shape.

BRIEF DESCRIPTION OF THE DRAWINGS

In the following the invention is described in more detail with reference to the accompanying drawing wherein.

DETAILED DESCRIPTION

Figure 1:
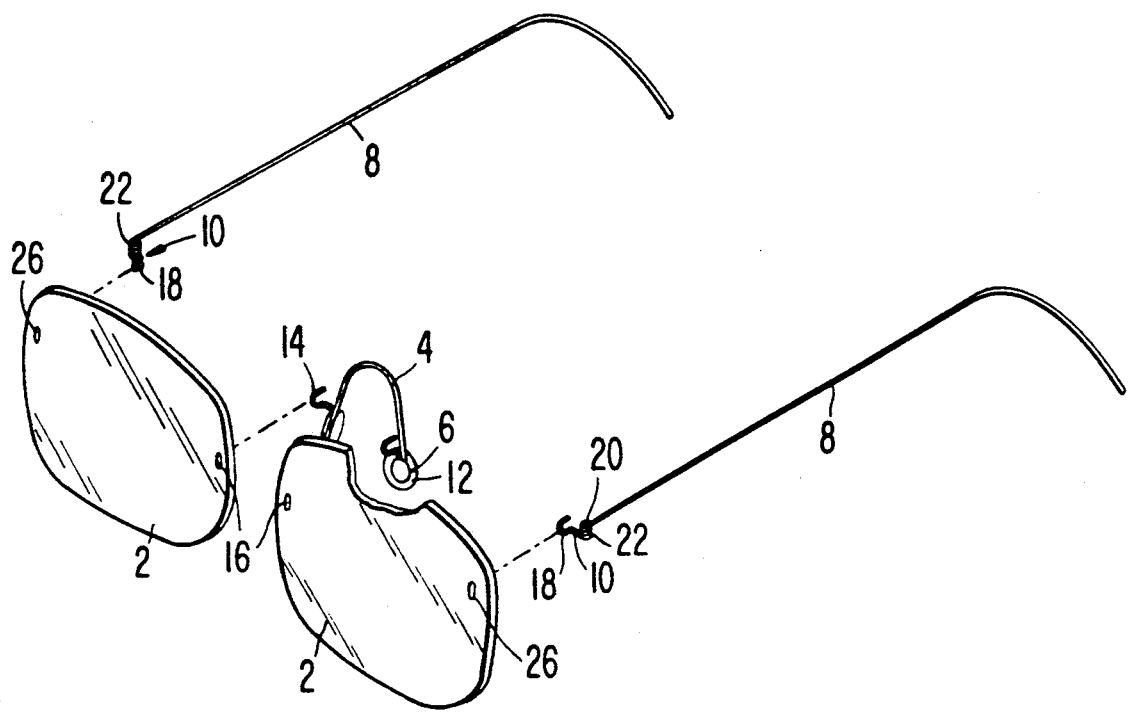
FIG. 1 is a perspective exploded view of a pair of eyeglasses according to the invention.
Figure 2:
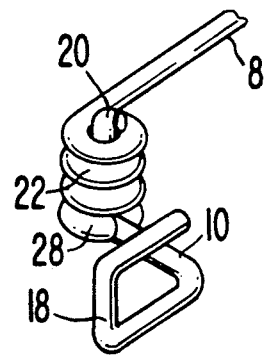
FIG. 2 is a perspective view of an eyeglass hinge thereof.
Figure 3:
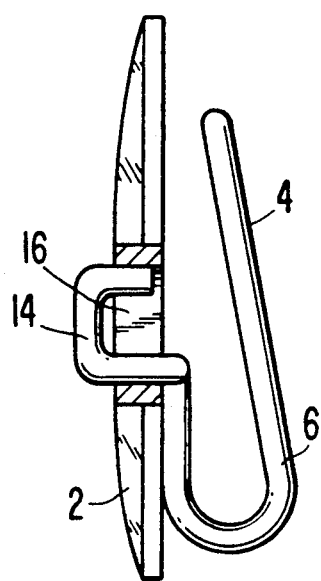
FIG. 3 is a cross sectional view of a joint area thereof.

The pair of eyeglasses shown in FIGS. 1-3 comprises two lens 2, a bridge 4 with pad arms 6, and two temples 8, each having a hinge part 10 for mounting on the lens 2.

The bridge is made of a rather stiff, but pronouncedly resilient wire material, preferably titanium wire, and is bent for forming the pad arms 6, which constitute downwardly projecting U-shaped loops, into which is inserted a holing base portion for a nose pad 12, which may consist of e.g. semi-soft plastic. From these loops the wire ends extend slightly laterally outwards and then forwards, upwards, and backwards through a forwardly projecting loop portion 14, in which the horizontal wire portions run parallelwise.

The loop portions 14 are designed for insertion into or through oblong holes 16 in the lens 2, with these holes 16 being provided with great accuracy for achieving a good securing.

The hinge parts 10 are likewise made of wire and show corresponding loop portions 18, wherefrom the wire continues slightly outwards to the side and therefrom upwards for forming a hinge pintle 20.

About this wire is placed the foremost, screw coiled end portion 22 of the associated temple 8, which is also made of the wire material. After placing the screw coil on the pintle 20, the upper end therof is bent out for axial locking of the screw coil, whereafter this is only turnable about the pintle 20, preferably with a certain friction. The rear, bent ear portions of the temples may of course if desired be coated with an appropriate coating material.

The loop portion 18 is designed for insertion into or through oblong holes 26 in the lenses 2, corresponding to the holes 16.

From the parts shown in FIG. 1 the eyeglasses may thus be assembled solely by inserting the loop portions 14 ans 18 into the holes 16 and 26. Because of the oblong shape of the holes 16, 26 and the loop portions 14, 18, no rotation may occur between the assembled parts.

The screw coil in each of the hinge parts 10 extends downwards from the front end of the temple 8 and ends in a lower end portion 28 (FIG. 2), which, by outward rotation of the temple, will abut the wire portion extending laterally from the loop portion 18, such that the rotation stop which is normal for eyeglasses or temples is formed in a simple manner.

The loop portions 14 and 18 should extend all the way to the front face of the lenses 2 for optimizing the fastening, but as shown in FIG. 3, the loop portions 14, 18 preferably protrude somewhat in front of the front face of the lenses 2, whereby it may optionally apply that a resilient expansion effect of the outer ends of the loop portions 14, 18 may be exploted for the fastening. However, another and more essential effect of the protruding loop portions 14, 18 will be that they will be able to fasten additional glasses in an easily releasable manner, when these glasses are provided with appropriate holes corresponding to the holes 16 and 26 in the lenses 2. These additional glasses may be extra lens glasses, e.g. half lenses for reading, or they may be sun shade glasses or other special glasses which may be mounted in an extremely discreet manner.

The user will even in a simple manner be able to make use of one and the same frame for different sets of lenses, though in practice this will hardly be decisive as the wire frame is quite inexpensive to produce.

It should be mentioned that the preferred wire material, i.e. titanium wire, has the quality that it can be given different colors by a tempering technique based on electric heating, whereby it is possible to obtain a surface coloring with several different colors along the tmeples, and such a coloring or multi-coloring of the temples will be comprised by the invention, as it is widely known that cosmetic factors in connection with eyeglasses may have a very great significance for production and sales.

In connection with the invention it is particularly appropriate that the frame and herein the protruding holder loops 14 and 18 may consist of bent wire material, but it is to be emphasized that to obtain the primary advantages it is no condition that the holder members should consist just of wire. These holding portions may well be embodied of other materials, e.g. plastic, which may even be cast onto frame portions of the wire material. Regardless of whether the holder members of metal or plastic are to be used, it may, however, be an advantage that these bodies be shaped with a grooving which provides a resilient fastening of the portions in the oblong holes 16, 26.

As far as the special hinges according to the invention are concerned, cf. FIG. 2, the rotation stop as established between an end portion of the screw coil 22 and a radial wire portion 10 of the other hinge part is indeed an operative stop which in practical use hinders the temple from being swung further than the swung-out position of use, but which, however, has a possibility for allowing the temple to be swung further outwards in case of pronounced overload, without the hinge being broken or the connected wire portions being durably deformed. The screw coil 22 may in itself be slightly resiliently compressible, such that at the overload the stop end 28 may pass above the blocking wire 10 without any breaking or durable deformation of the hinge parts. This is a great advantage compared to usual eyeglass hinges, which are normally durably damaged if overloaded.

Figure 4:
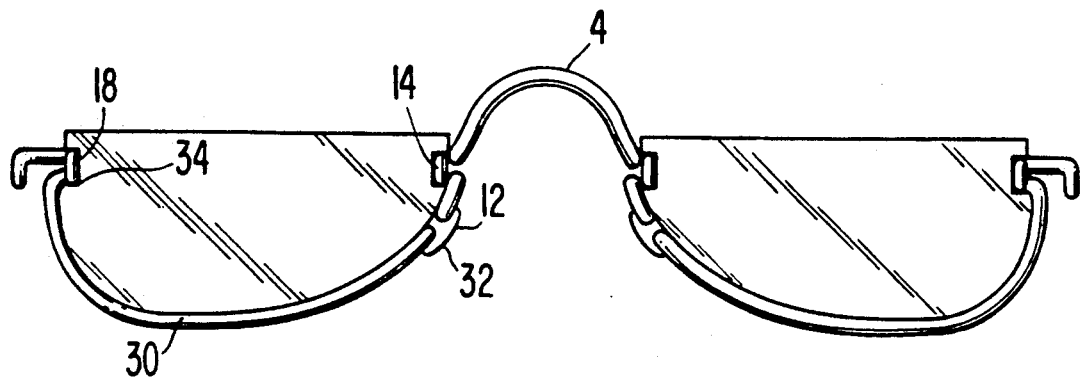
FIG. 4 is a front view of a pair of semi-rimless eyeglasses according to the invention.

By the eyeglasses shown in FIG. 4, the rigid hinge parts are shaped just as in FIG. 2, but the wire loop 18 is continued in a wire 30 which extends downwards and inwards along the rim of the lens 2, to a rearwardly bent loop portion 32 for fastening the pad 12, and further on to connection to the loop portion 14 also indicated in FIG. 1, i.e. the wire continues in this loop portion and extends therefrom further upwards to and through the bridge 4, whereafter the wire extends in a symmetrical manner out along the other lens. Thus, a single through-going frame wire will be concerned, the free ends of which are located at the opposite outer hinge areas, and the hinges may hereby be shaped principally or even precisely as indicated in FIG. 2. The frame production as well as the mounting will be facilitated by the frame thus consisting of but a single wire member. The holder loops 14 and 18 are protruding as in FIG. 3, and they are shown received in edge recesses 34 in the lenses, being held in this engagement by a resilient tension in the frame.

When a through-going wire is used, as in FIG. 4, the holes or recesses 16, 26, 34 need not be of an oblong shape, as the frame wire in itself will secure a non-rotatable connection with the lenses. Hereby the holes 16 and 26 in FIG. 1 may thus be embodied with a circular shape.

Figure 5:
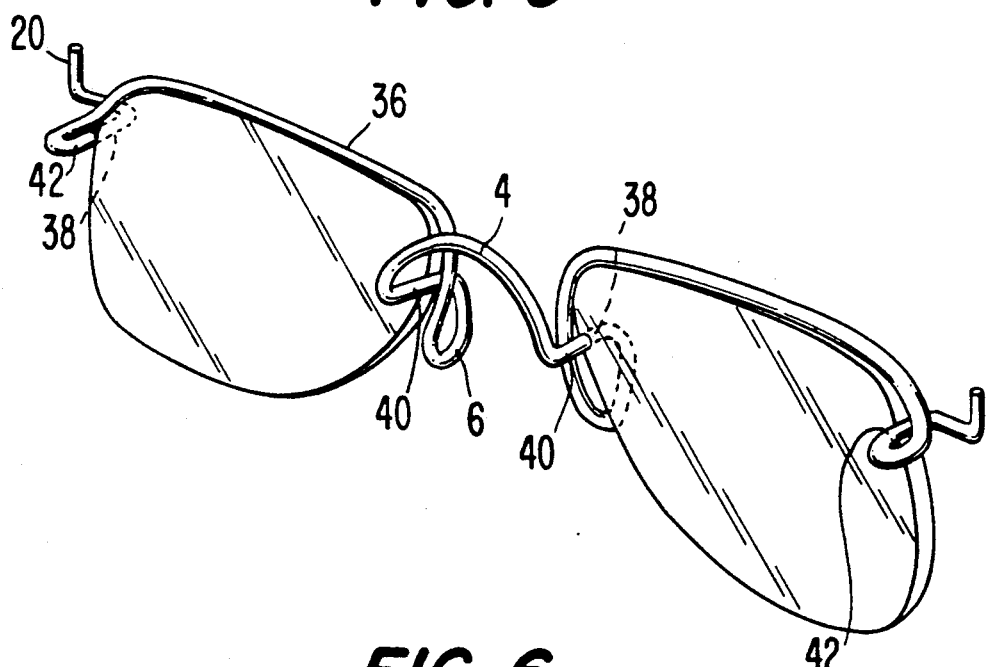
FIG. 5 is a corresponding view of another pair of semi-rimless eyeglasses according to the invention.
Figure 6:
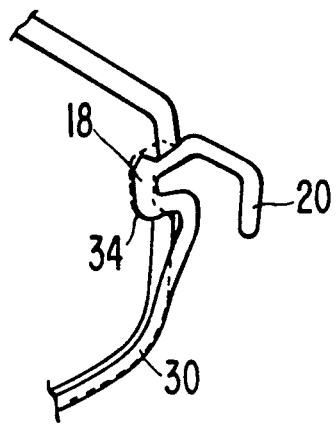
FIG. 6 is a perspective view of a detail of FIG. 6.

In FIG. 5 is shown an example where a through-going frame wire 36 which extends along the upper edge of the lenses secures the lenses by single-wire portions, which are received in semi-circular recesses 38 in the lenses. Such wire portions, designated 40 and 42, extend forwards from the lenses and continue in the frame in the manner indicated, to the bridge 4 and the hinge parts, respectively.

The frames shown are entirely made from wire, but it will be appreciated that the projecting portions 14, 18, 40, 42, may well be provided in another manner, e.g. as cast portions of silicon rubber on a frame which may otherwise be of any suitable type and shape.

It should be noted that the disclosed special wire eyeglasses excel as eyeglass structures also in case of the holder members do not protrude from the front face of the lenses, i.e. even if the possibility for additional glass holding hereby disappears.

Figure 7:
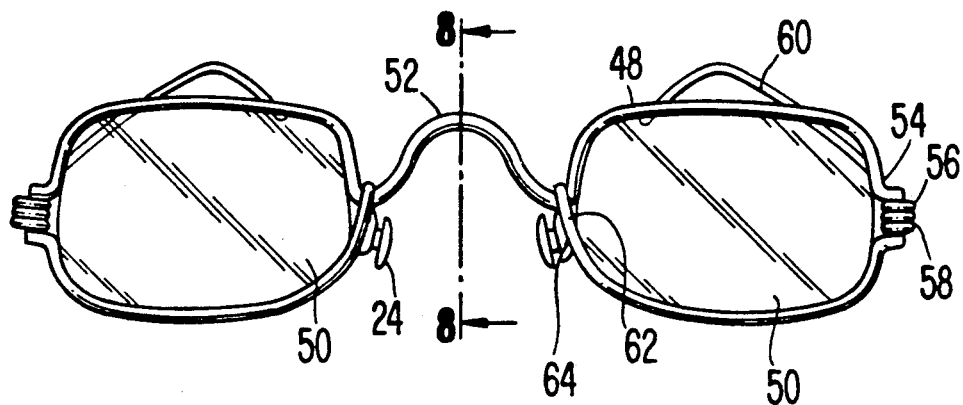
FIG. 7 is a front view of a pair of full-rimmed eyeglasses according to the invention.

The pair of eyeglasses shown in FIG. 7 is of the entirely rimmed type, where both the lens holding front frame and the temples are constituted by wire material. The front frame is made of a single wire 48, preferably a titanium wire, which extends along the lens rims and may be received in an edge groove thereof, which is shown in FIG. 7. The glasses are designated 50, and the wire extends symmetrically from a nose bridge 52 upwards and outwards along the upper rim of the lenses 50, by the outer sides of which the wire continues downwards to a hinge area, where the wire is provided with a loop or eyelet 54, which has an outermost, vertical wire portion 56 functioning as a pivot pintle for a screw coiled end portion 58 of the connected, equally wire-shaped temple 60. From the loop 54 the wire continues downwards and inwards along the lower edge of the lens 50, and therefrom from upwards in a wire portion 62 which is closed about the lower transition area between the nose bridge 52 and the therefrom upwardly and outwardly extanding wire portion, such that hereby the wire encircles the lens 50 in a tight manner. The wire portion 62 continues after the bend in a downwardly extending portion 64, see also FIG. 8, which continues in a bent eye portion 66, in which the wire ends at 68. The eye portion 66 is used for receiving a foot portion 70 of a nose pad 72 consisting of semi-soft plastic material.

It will be appreciated that the hinge 54, 56, 58 may widely correspond to the hinge shown in FIG. 2, i.e. such that a free end portion 28 of the screw winding 58 will cooperate with one of the horizontal wire portions of the loop or eyelet 54 to form a stop for the swinging out of the associated temple 60.

It will be appreciated, however, that the invention is not restricted to the hinge parts having to be made of wire material, as the screw winding 58 could be replaced by another cylindrical member provided e.g. by casting onto the temple 60.

Figure 8:
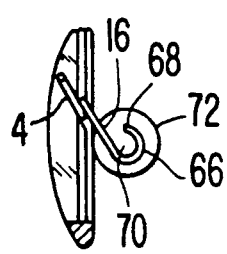
FIG. 8 is a sectional view seen along line VII—VII of FIG. 6, FIGS. 9 and 10 are cross sectional views of a preferred frame wire.
Figure 9:
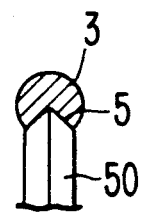

In FIG. 9 the frame wire, designated 3 may be profiled so as to have a segment recess 5 of some 90°, whereby it can receive and hold an edge sharpened lens 50, i.e. without the lens having to be provided with an edge groove as shown in FIG. 8. The wire 3 is easily produced with such a groove 5, but generally the groove will be undesirable at such places where the wire has no lens holding purpose, i.e. in the nose bridge and in the hinge portion 54, 56.

Figure 10:

According to the invention, however, it is possible to effect a circumferential compression of the wire along selected length portions thereof, such that the wire outside the lens holding portion thereof is deformed as illustrated in FIG. 10, i.e. compressed into a compact, practically circular cross sectional shape, in which the recess 5 is practically entirely closed. Thus, both in the nose bridge portion and in the temple hinge portion the frame wire may occur as a smooth round wire even if the same wire as extending along the lens edges is provided with a groove 5 for receiving the sharpened edges of the lens.

Figure 11:
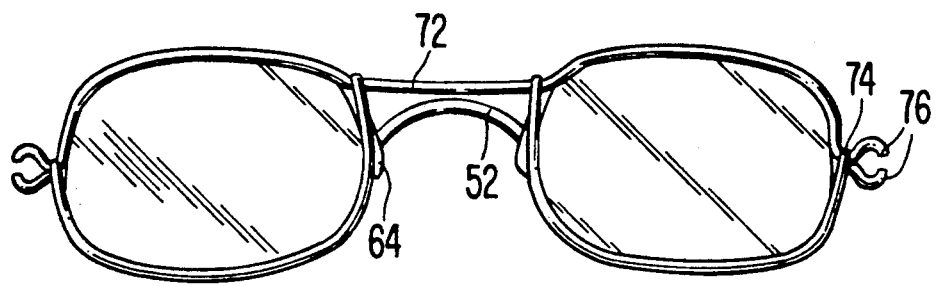
FIG. 11 is a front view of a modified part of full-rimmed eyeglasses according to the invention.

In FIG. 11 is shown an entirely rimmed pair of eyeglasses, the frame of which consists of two wires, whereof one extends along the upper rims of the lenses and forms an upper bridge portion 72 between these, while the other forms the nose bridge 52 and the pad arm eyelets 64. The wires are assembled by bends 74 at the hinge areas and continue therefrom in hinge pintles facing each other.

We claim:

1. Eyeglasses having a pair of adjacent lens means and frame means comprising holding means for engaging the lens means, said frame means being fashioned of a wire, said holding means including bent loop wire portions projecting straightforwardly from the frame means, said lens means including mounting slits disposed at a position spaced from an outer peripheral edge of the lens means for respectively receiving said bent loop wire portions, each of said slits having a substantially oblong configuration corresponding to a cross-sectional shape of the bent loop wire portions such that the bent wire portions and the slits provide the sole connection between the lens means and the frame means, with the bent loop wire portions being resiliently squeezed between opposed narrow end portions of said slits thereby ensuring a firm releasable securement between the lens means and the frame means.

2. Eyeglasses according to claim 1, wherein a central bridge means is disposed between the lens means and opposed outer temple hinge means, said central bridge means and opposed outer temple hinge means being mutually separated to form an entirely rimless eyeglass structure, said central bridge means includes two spaced bent loop wire portions, further slits are disposed at a position spaced from an inner peripheral edge provided at said lens means, said loop wire portions of said central bridge means being adapted to be resiliently accommodated in the respective further slits whereby said central bridge means and said pair of outer temple hinge means are exclusively secured by the bent loop wire portions in the respective slits in the lens means in a non-rotatable manner.

3. Eyeglasses according to claim 1, wherein the bent loop wire portions of said holding means project forwardly with a length greater than a thickness of the lens means for releasably receiving at least one additional lens means or an additional glass forwardly of said pair of lens means.

4. Eyeglasses according to claim 2, wherein the bent loop wire portions of said central bridge means includes further loop wire portions provided at respective ends thereof for forming holding base means for accommodating nose pad means.

5. Eyeglasses according to claim 1, wherein the bent loop wire portions are respectively extended to form respective hinge means for temple portions of the frame means.

6. Eyeglasses according to claim 5, wherein the hinge means includes straight wire portions for accommodating surrounding sleeve means of the temple portions of the frame means.

7. Eyeglasses according to claim 6, wherein the temple portions are formed of a wire, and wherein the sleeve means includes helically wound portions of the wire of the temple portions.

8. Eyeglasses according to claim 5, wherein the respective hinge means include a straight wire portion integral with one of the respective bent loop wire portions of the holding means and temple portions, and a wire coil means surrounding said straight wire portion and formed integrally with the other of said bent loop wire portion of the holding means and said temple portions.

9. Eyeglasses according to claim 8, wherein stop means are provided for limiting a rotation of the hinge means including a free end portion of said wire coil means adapted to abut against a radially bent portion of said straight wire portion.

10. Eyeglasses having a pair of adjacent lens means and frame means comprising holding means for engaging the lens means, said frame means being fashioned of a single layer, said holding means including bent loop wire portions projecting from the frame means, said lens means including outwardly open notches provided on opposed edges of the adjacent lens means and outer edges thereof, said notches being of an oblong configuration and being dimensioned for resiliently accommodating the bent loop wire portions therein, with the bent loop wire portions being resiliently squeezed between opposed narrow end portions of said notches thereby ensuring a firm releasable securement between the lens means and the frame means, and wherein said single wire forms at least a half rim for each of the pair of lens means, a central bridge means and hinge means adapted to be rotatably joined with associated temple portions of the eyeglasses.

11. Eyeglasses according to claim 10, wherein said hinge means includes a hinge pintle provided at outer ends of said single frame wire adjacent the bent loop wire portions resiliently squeezed in the notches provided at the outer edges of the respective lens means.

12. Eyeglasses according to claim 11, wherein the temple portions each include a single wire having a free end and coil-wound portions provided at an end opposite said free end for accommodating the respective hinge pintles.

13. Eyeglasses according to claim 12, wherein each coil-wound portion terminates in a free end portion forming a stop means adapted to be brought into contact with a portion of the hinge means so as to limit a rotatable movement of the respective temple portions with respect to said frame means.

* * * * *